United States Patent [19]
Quadflieg et al.

[11] Patent Number: 6,086,252
[45] Date of Patent: Jul. 11, 2000

[54] CORRECTION OF FIXED PATTERN NOISE

[75] Inventors: Peter Quadflieg; Gerhard Spekowius, both of Aachen, Germany

[73] Assignee: U.S. Philips Corporation, New York, N.Y.

[21] Appl. No.: 09/404,873

[22] Filed: Sep. 27, 1999

Related U.S. Application Data

[63] Continuation of application No. 08/889,274, Jul. 8, 1997, abandoned.

[30] Foreign Application Priority Data

Jul. 8, 1996 [EP] European Pat. Off. .............. 96201899

[51] Int. Cl.[7] ...................................... H01J 31/00
[52] U.S. Cl. .................. 378/207; 378/98.8; 250/214 VT
[58] Field of Search .................... 378/207, 98.2, 378/98.3, 98.8, 98.11, 98.12; 250/214 VT

[56] References Cited

U.S. PATENT DOCUMENTS

| | | | |
|---|---|---|---|
| 2,929,935 | 3/1960 | Lempert | 250/214 VT |
| 3,201,630 | 8/1965 | Orthuber et al. | 250/214 VT |
| 3,345,534 | 10/1967 | Charles | 250/214 VT |
| 3,365,577 | 1/1968 | Teeg et al. | 250/214 VT |
| 4,134,010 | 1/1979 | Eberhardt | 250/213 |
| 5,020,085 | 5/1991 | Kawara et al. | 378/98.11 |
| 5,031,620 | 7/1991 | Oe | 378/98.12 |
| 5,452,338 | 9/1995 | Granfors et al. | 378/98.11 |

FOREIGN PATENT DOCUMENTS

| | | |
|---|---|---|
| 4001010A1 | 7/1991 | Germany . |
| 4420833A1 | 12/1995 | Germany . |

*Primary Examiner*—David P. Porta
*Assistant Examiner*—Drew A. Dunn
*Attorney, Agent, or Firm*—Dwight H. Renfrew

[57] ABSTRACT

An X-ray image intensifier (1) includes an entrance screen (2) with a photocathode (3). A television camera (15) is optically coupled to the exit window (12) of the X-ray image intensifier. The X-ray image intensifier with the television camera derives a primary image signal form an X-ray image on the entrance screen. The X-ray image intensifier is provided with a radiation source (4), such as flashlights or LEDs, for irradiating the photocathode (3). Irradiation of the photocathode produces a light intensity distribution on the exit window wherefrom the television camera derives a control signal. Correction numbers are derived from the signal levels of the control signal. These correction numbers are employed for correcting the primary image signal.

12 Claims, 2 Drawing Sheets

CORRECTION OF FIXED PATTERN NOISE

This application is a continuation of application Ser. No. 08/889,274, filed Jul. 8, 1997 now abondaned.

BACKGROUND OF THE INVENTION

1. Field of the Invention

The invention relates to a method for processing an X-ray image. The invention also relates to an X-ray image intensifier comprising an entrance screen with a photocathode. The invention further relates to an X-ray examination apparatus comprising an X-ray detector for deriving a low-energy radiation image from an X-ray image and for deriving a primary image signal from the low-energy radiation image and a correction system for deriving a corrected image signal from the calibration signal and the primary image signal.

2. Description of Related Art

Such a method and such an X-ray image intensifier and X-ray examination apparatus are known from the German Offenlegungsschrift DE 40 01 010.

The known method requires the formation of a separate test X-ray image of a test plate made of a homogeneous material and having a uniform thickness. From the test X-ray image a test video signal is derived by means of a video camera and the test video signal is stored in a memory unit. When a patient is to be radiologically examined an X-ray image of the patient is formed and converted into a video signal. The X-ray image is processed in that the video signal of the X-ray image of the patient is divided by the test video signal. Thus, the signal levels of the test video signal represent correction numbers which are used to correct the primary image signal formed by the video signal of the X-ray image.

Accurate correction of the video signal would be achieved only if the circumstances during the X-ray imaging of the test plate were identical to the circumstances during the X-ray imaging of the patient. However, in practice numerous aspects of the X-ray imaging circumstances will change between the formation of the test X-ray image and the X-ray imaging of the patient. Consequently, the test video signal often quite inaccurately represents perturbations of the primary image signal. Notably, because as a special test plate is imaged to form the test X-ray image, the known method does not enable the test X-ray image to be obtained when the patient is positioned for irradiation with the X-ray beam. On the contrary, often a substantial period of time will elapse between the forming of the test X-ray image and the X-ray imaging of the patient. During that period the electrical voltages applied to an electro-optical system of an X-ray image intensifier may change, either intentionally when the magnification of the X-ray image intensifier is changed, or unintentionally due to drift of the electrical voltages and/or there may be a change in the orientation of the X-ray image intensifier with respect to an external magnetic field such as the terrestrial magnetic field. Moreover, during said period temperature changes may take place. Therefore, the previously formed test X-ray image is often inadequate for accurate correction.

SUMMARY OF THE INVENTION

An object of the invention is to provide an method for processing an X-ray image which enables more accurate correction of the primary image signal than the conventional method.

This is achieved by the method according to the invention which is characterized in that apart from the incidence of X-rays on the X-ray sensitive surface a calibration low-energy radiation intensity distribution is generated.

The calibration low-energy radiation intensity distribution is a predetermined distribution which would cause a predetermined ideal signal level if there were no perturbations, so that a difference between the calibration signal level and the ideal signal level represents a perturbation. The derivation of the calibration signal from the low-energy radiation intensity distribution and the derivation of the primary image signal from the low-energy radiation image include substantially or even exactly the same perturbations. Hence the calibration signal is suitable to eliminate most perturbations from the primary image signal.

The method according to the invention allows that the calibration low-energy radiation intensity distribution is generated immediately before or after the formation of the x-ray image. That is, between the generation of the calibration low-energy radiation intensity distribution at most a short period of time lapses, so that the relevant circumstances for at least a portion of the perturbations of the primary image signal are hardly or not at all changed during said period. Moreover, according to the invention it is not required to generate x-radiation for generating the calibration radiation intensity distribution.

Various types of X-ray detectors may be employed to detect X-ray images. For example, the X-ray detector may be an X-ray image intensifier/television chain or an X-ray sensor matrix. The method for processing an X-ray image according to the invention is suitable to be applied to X-ray images formed with any of such X-ray detectors. When an X-ray image intensifier television chain is employed, the X-ray image is formed on an entrance screen of the X-ray image intensifier. The X-ray image is converted into a light-optical image on an exit window of the X-ray image intensifier. The light-optical image on the exit window forms the low-energy radiation image. A television camera derives the primary image signal as an electronic video signal from the light-optical image. An X-ray image sensor matrix usually comprises an X-ray sensitive conversion layer and a matrix of photosensor elements, for example photodiodes. Incident x-radiation is converted into low-energy radiation, such as infrared or visible (red or green) light whereto the photosensor elements are substantially sensitive. That is, the X-ray image is formed on the conversion layer which thus generates the low-energy radiation image. The photosensor elements generate electrical charges due to incident low-energy radiation, the electrical charges are read-out and the primary image signal is derived from the charges. The calibration signal is generated from the calibration low-energy radiation intensity distribution. In case an X-ray image intensifier is employed, the photocathode is irradiated so that electrons are emitted which generate the calibration low-energy radiation intensity distribution on the exit window. In case an X-ray image sensor matrix is used the calibration low-energy intensity distribution is used to activate the photosensor elements. In any case the calibration low-energy radiation intensity distribution causes a calibration signal that is formed by the photosensor elements of the image sensor matrix or the television camera. The calibration signal comprises signal levels representing intensity values at respective positions in the calibration low-energy radiation intensity distribution. The signal level of the calibration signal includes the perturbations caused in the generation of the primary image signal from the X-ray image. Such perturbations include electron-optical and light-optical distortions, vignetting and structural noise. Such structural noise is caused, for example, by local defects in the X-ray image intensifier, notably local defects of the photocathode and the exit window with its phosphor layer, or local defects in an image sensor of the television camera or in the photosensitive elements of the X-ray image sensor matrix.

An x-ray examination apparatus for example comprises an x-ray image sensor matrix with a conversion layer for converting an x-ray image into a low-energy radiation image, and sensor elements for converting the low-energy radiation image into electric charges preferably includes a radiation source for irradiating the sensor elements. The method of processing an x-ray image according to the invention is advantageously carried out by means of such an x-ray examination apparatus. The radiation source irradiates the sensor elements with the calibration low-energy radiation intensity distribution having a wavelength in a range for which the sensor elements are substantially sensitive. The calibration low-energy radiation intensity distribution generates electric charges in the sensor elements and from these charges the calibration signal is derived. The conversion layer derives the low-energy radiation image from the x-ray which is formed on the conversion layer. The low-energy radiation image generates electric charges in the sensor elements and from these charges the primary image signal is derived. The calibration signal and the primary image signal comprise substantially the same perturbations. Such perturbations notably include perturbations caused by local deviations or defects of individual sensor elements. Such perturbations are substantially eliminated in the corrected image signal that is derived from the primary image signal and the correction signal. The calibration low-energy radiation intensity distribution, which is a predetermined distribution would cause an ideal signal level of the calibration signal if there were no perturbations. Any difference between the actual signal level of the calibration signal and the ideal signal level represents a perturbation. The formation of the low-energy radiation does not necessitate some special test object to be placed in the X-ray beam. The method according to the invention allows the low-energy radiation distribution to be formed immediately before or after formation of the X-ray image of the patient to be examined. This means that between the generation of the low-energy radiation distribution and the formation of the X-ray image or vice versa no more than a very short period of time elapses, so that the relevant circumstances which cause at least a portion of perturbations in the primary image signal is hardly or not at all changed during said period.

From the calibration signal correction numbers are derived. Correction of the primary image signal is carried out using these correction numbers, in that signal levels of a corrected image signal are derived, for example calculated, from the primary image signal and the correction numbers. The calibration signal and the primary image signal are formed under substantially the same circumstances. The calibration low-energy radiation intensity distribution is preferably stable and well reproducible. Notably the temperature, orientation with respect to the terrestrial magnetic field and electric potentials of the electron-optical system are substantially the same while forming the calibration signal and while forming the primary image signal. Hence, the calibration signal comprises signal levels that accurately represent perturbations in the primary image signal, so that accurate correction numbers are derived.

Moreover, generating the accurate correction numbers does not require, activation of the X-ray source. Hence, the method of the invention avoids exposing anyone to harmful X-radiation for deriving the correction numbers.

A preferred implementation of the method for processing an X-ray image according to the invention is characterized in that the calibration low-energy radiation intensity distribution is spatially substantially uniform.

The calibration low-energy radiation intensity distribution is substantially uniform in that the spatial intensity variations are much smaller than intensity variations which represent image information in the low-energy radiation distribution derived from the X-ray image. The calibration signal derived from such a substantially uniform low energy radiation intensity distribution represents substantially only perturbations associated with the conversion of the low-energy radiation image into the primary image signal.

A further preferred implementation of a method for processing an X-ray image according to the invention is characterized in that respective correction numbers are derived from respective ratios of intensity values to a maximum intensity value of the calibration low-energy radiation distribution.

A further preferred implementation of a method of processing an X-ray image according to the invention is characterized in that a calibration signal is derived from the calibration low-energy radiation distribution and respective correction numbers are derived from respective ratios of respective signal levels to a maximum signal level of the calibration signal.

The ratio of an intensity value of the calibration low-energy radiation distribution to the maximum intensity value represents the perturbation. Notably perturbations that cause slow variations in the primary image signal are corrected very accurately. Such perturbations are likewise accurately represented by the ratio of the signal level of the calibration signal to the maximum signal level of the calibration signal.

A further preferred implementation of a method of processing an X-ray image according to the invention wherein an X-ray image intensifier converts the X-ray image into the low-energy radiation image and comprises an entrance screen including a photocathode, is characterized in that prior to the formation of the X-ray image the photocathode is irradiated with a radiation intensity distribution whereto the photocathode is sensitive.

The X-ray image is formed on the entrance screen of the X-ray image intensifier. The entrance screen converts the X-ray image into photoelectrons. The entrance screen incorporates a conversion layer and a photocathode for this purpose. The conversion layer converts X-rays into radiation whereto the photocathode is sensitive. The X-ray image intensifier furthermore comprises an exit window including a phosphor layer. The photoelectrons from the photocathode generate the low-energy radiation image on the phosphor layer. An image pick-up apparatus, such as a television camera, derives the primary image signal from the low-energy radiation image. Before or after, preferably just before or after, the X-rays are incident on the entrance screen, the photocathode is irradiated with a radiation intensity distribution whereto the photocathode is substantially sensitive.

Owing to irradiation of the photocathode, for example with blue or ultraviolet light, an electron beam is emitted by the photocathode. The electron beam is directed by means of an electron-optical system to the phosphor layer on an exit window. The electronoptical system electron-optically images the photocathode on the phosphor layer. Electrons which are incident on the phosphor layer generate in the phosphor material a light intensity distribution that corresponds to the calibration low-energy radiation intensity distribution, and the calibration signal is derived from the light intensity distribution which the image pick-up apparatus picks-up from the exit window. The calibration signal levels include perturbations that have occurred in the conversion of the calibration low-energy radiation intensity distribution into the calibration signal. If the calibration low-energy radiation intensity distribution is substantially spatially uniform then variations of the signal level of the calibration signal mainly represent such perturbations.

Another object of the invention is to provide an X-ray image intensifier that is suitable for carrying out the method of the invention.

This object is achieved by an X-ray image intensifier according to the invention which is characterized in that the X-ray image intensifier is equipped with a radiation source for irradiating the photocathode.

The method of processing an x-ray image according to the invention is advantageously carried out by an x-ray image intensifier television chain which comprises an x-ray image intensifier equipped with a radiation source which generates the calibration low-energy radiation intensity distribution on the photocathode. The calibration low-energy radiation intensity has a wavelength in the range for which the photocathode is substantially sensitive. The calibration low-energy radiation intensity distribution generates an electron beam from the photocathode. The electron beam is incident on a phosphor layer on an exit window and causes the phosphor layer to emit light. The television camera picks up the light from the phosphor layer and derives the calibration signal.

The entrance screen is provided with a conversion layer. An x-ray image is formed on the conversion layer which generates the low-energy radiation image. The low-energy radiation image generates an electron beam which generates a light image on the phosphor layer on the exit window. The television camera derives the primary image signal from the light image. The calibration signal and the primary image signal comprise substantially the same perturbations. Such perturbations notably include electron-optical and light-optical distortions, vignetting and structural noise. Such structural noise is e.g. caused by local deviations in the x-ray image intensifier, notably local defects of the photocathode and of the phosphor layer, or local deviations of the image sensor of the television camera. Particularly suitable radiation sources are light-emitting diodes or flashlights. Such radiation sources may be chosen so that they emit radiation, for example light, having a wavelength whereto the photocathode is substantially sensitive. Such radiation sources may easily be arranged so as to emit a spatially uniform intensity distribution onto the photocathode.

These and other aspects of the invention are discussed in more detail with reference to the embodiments presented hereinafter and with reference to the accompanying drawing.

BRIEF DESCRIPTION OF THE DRAWINGS

The drawing comprises the following Figures wherein.

DETAILED DESCRIPTION OF THE PREFERRED EMBODIMENTS

Figure 1:
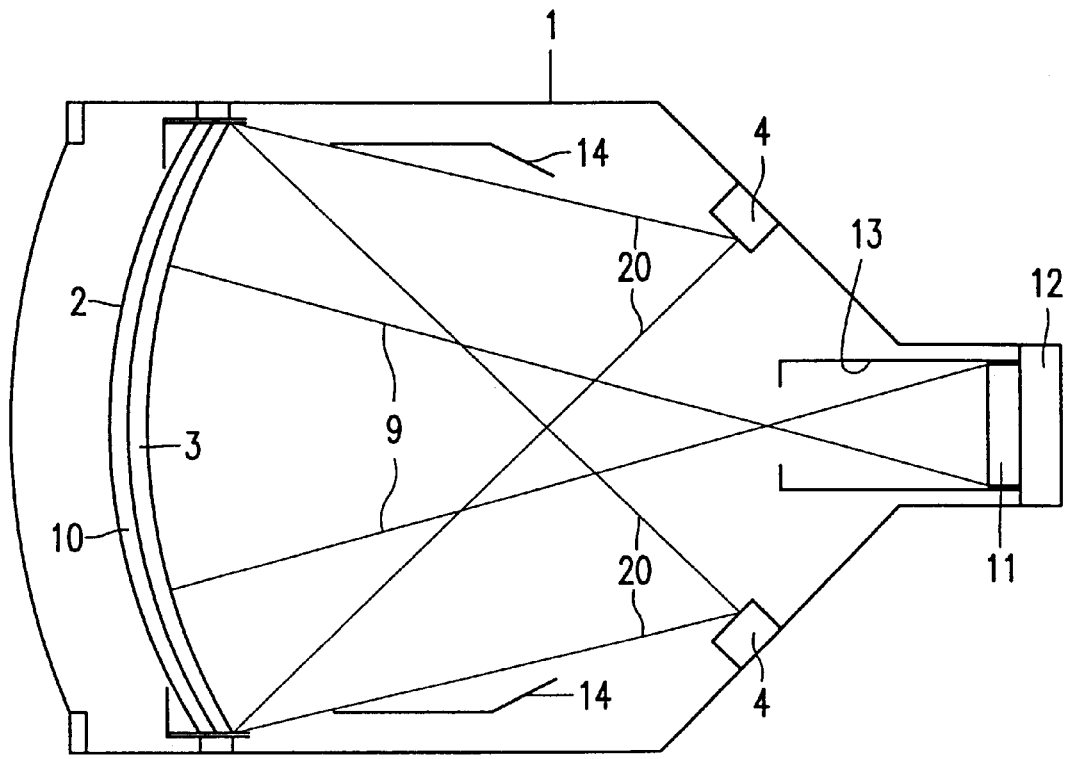
FIG. 1 shows schematically an X-ray image intensifier tube according to the invention.

FIG. 1 shows schematically an X-ray image intensifier tube according to the invention. The X-ray image intensifier 1 comprises a entrance screen 2 which comprises a conversion layer 10 and a photocathode 3. The conversion layer converts X-radiation into radiation whereto the photocathode is substantially sensitive. For example, the incident X-radiation generates blue light or ultra-violet radiation in the conversion layer. The radiation from the conversion layer generates an image carrying electron beam 9 from the photocathode. An electron-optical system guides the electron beam to a phosphor layer 11 on the exit window 12. The electron optical system includes the photocathode, a hollow anode 13 and guide electrodes 14. The electron beam 9 generates a light-optical image in the phosphor layer 11 on the exit window 12. The light-optical image is picked-up by a television camera 15. The television camera may be a CCD-camera which comprises a CCD-image sensor, but a camera comprising an image pick-up tube, like a Plumbicon tube, may also be employed.

Radiation sources 4 are mounted inside the X-ray image intensifier 1. The radiation sources 4 irradiate the photocathode with radiation whereto the photocathode is sensitive. Hence, electrons are generated from the photocathode by the radiation from the radiation sources 4. The radiation from the radiation sources 4 may have a wavelength near the wavelength of the radiation generated by the conversion layer. The radiation sources 4 may be flashlights or light-emitting diodes. The radiation sources are arranged such that they emit radiation beams 20 which cover substantially the entire area of the photocathode 3, at its side which is remote from the conversion layer 10, with a spatially uniform intensity. The radiation sources 4 generate electrons that are guided to the phosphor layer 11 on the exit window 12 and the electrons generate a light intensity distribution in the phosphor layer 11. That is, the electrons that are generated from the photocathode by the radiation from the radiation sources 4 themselves generate the calibration low-energy radiation intensity distribution having a predetermined spatially uniform intensity. The television camera 15 derives the calibration signal from the light intensity distribution on the exit window 12. Ideally, if there were no perturbations, the uniform intensity distribution generated by the radiation source 4 would lead to a uniform light intensity on the exit window and the calibration signal would have a constant signal level. The actual calibration signal that is derived from the uniform intensity distribution represents the combined effect of all sorts of perturbations that are introduced by irregularities in the photocathode, the electron optics, the exit window with its phosphor layer, the optical coupling 16 from the exit window 12 to the television camera 15 and the television camera 15 itself. The calibration signal can be formed just before or after, within a few seconds, the formation of an X-ray image of the patient.

Figure 2:
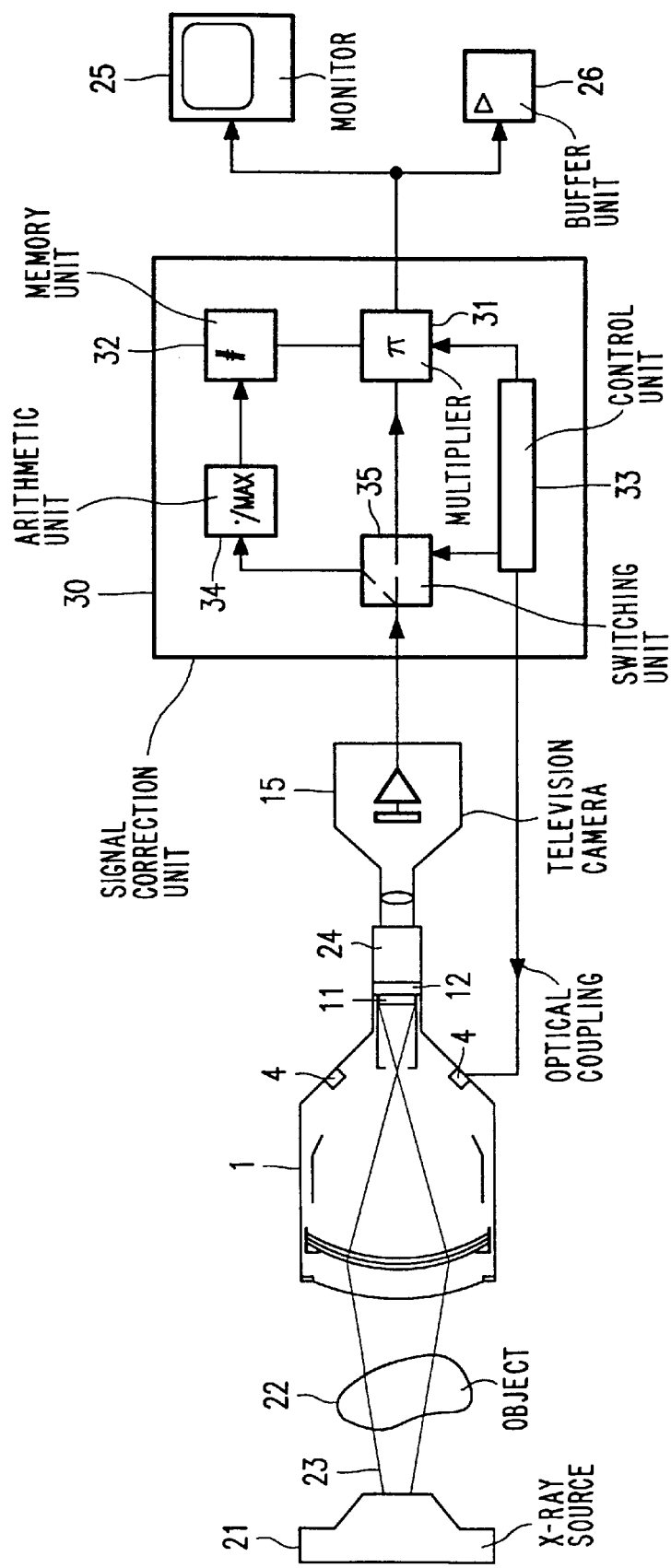
FIG. 2 shows schematically an X-ray examination apparatus suitable for performing the method according to the invention.

FIG. 2 shows schematically an X-ray examination apparatus suitable for performing the method according to the invention. The X-ray apparatus is provided with an X-ray source 21 for irradiating an object 22 with an X-ray beam 23. The X-ray image on the entrance screen of the X-ray image intensifier is converted into a light-optical image on the exit window. The television camera 15 derives the primary image signal from the light-optical image. A signal correction unit 30 generates a corrected image signal. The signal correction unit 30 is coupled to a monitor 25 or to a buffer unit 26. The image information of the X-ray image is displayed on the monitor 25. The corrected image signal may also be applied to the buffer unit 26 and be further processed later or be printed as a hard-copy. The X-ray image intensifier 1 faces the X-ray source 21 and an object is placed between the X-ray source 21 and the X-ray image intensifier 1. The object is, for example a patient to be radiologically examined. Because of local variations of X-ray absorption in the patient an X-ray image is formed on the entrance screen 2 of the X-ray image intensifier 1. The X-ray image is converted into a light-optical image on the exit window 12. The television camera 15 is optically coupled to the exit window by means of an optical coupling 24, for example a system of lenses or a fibre optical coupling. The television camera 15 derives the primary image signal from the light-optical image. The primary image signal is supplied in the form of an electronic video signal. The electronic video signal has signal levels that represent the brightness at respective positions in the light-optical image on the exit window. The output port of the television camera is coupled to a signal correction unit 30.

The signal correction unit 30 corrects the primary image signal for perturbations introduced in the conversion of the low-energy radiation image from the conversion layer 10 into the primary image signal. To that end the signal correction unit 30 comprises a multiplier 31 which multiplies the primary image signal by correction numbers. The correction numbers are stored in a memory unit 32. In order to carry-out accurate correction, the radiation sources 4 are briefly activated by a control unit 33, just before or after the actual X-ray image of the patient is formed. The radiation sources 4 irradiate mutually illuminate the photocathode 3 with a substantially uniform intensity distribution, i.e. the calibration low-energy radiation intensity distribution. As a consequence the television camera 15 generates the calibration signal that is fed to the signal correction unit 30. The calibration signal is applied to an arithmetic unit 34 via a switching unit 35. The switching unit is operated by the control unit 33. The arithmetic unit 34 derives the maximum signal level from the calibration signal and calculates the respective ratios of the signal levels to the maximum signal level. These ratios form the correction numbers that are stored in the memory unit 32. Any deviations of the correction numbers from unity represent perturbations. When the memory unit 32 is updated with accurate correction numbers, the control unit operates the switching unit 35 in order to apply the primary image signal to the multiplier 31. The perturbations in the primary image signal are removed by multiplying the primary image signal by the correction numbers, i.e. multiplying respective signal levels of the primary image signal by respective correction numbers.

What is claimed is:

1. A method for processing an x-ray image comprising:
   generating a calibration low-energy radiation distribution and deriving a calibration signal from the calibration low-energy radiation distribution,
   forming an x-ray image,
   deriving a low-energy radiation image from the x-ray image, deriving a primary image signal from the low-energy radiation image, and
   deriving a corrected image signal from the calibration signal and the primary image signal.

2. A method as claimed in claim 1 wherein the calibration low-energy radiation intensity distribution is spatially substantially uniform.

3. A method as claimed in claim 2 wherein respective correction numbers are derived from respective ratios of intensity values to a maximum intensity value of the calibration low-energy radiation distribution.

4. A method as claimed in claim 3 wherein a calibration signal is derived from the calibration low-energy radiation distribution, and respective correction numbers are derived from respective ratios of respective signal levels to a maximum signal level of the calibration signal.

5. A method as claimed in claim 1, wherein an X-ray image intensifier converts the X-ray image into the low-energy radiation image and comprises an entrance screen including a photocathode, and prior to the formation of the X-ray image the photocathode is irradiated with a radiation intensity distribution whereto the photocathode is sensitive.

6. The method of claim 2 wherein an X-ray image intensifier converts the X-ray image into the low-energy radiation image and comprises an entrance screen including a photocathode, and prior to the formation of the X-ray image the photocathode is irradiated with a radiation intensity distribution whereto the photocathode is sensitive.

7. The method of claim 3 wherein an X-ray image intensifier converts the X-ray image into the low-energy radiation image and comprises an entrance screen including a photocathode, and prior to the formation of the X-ray image the photocathode is irradiated with a radiation intensity distribution whereto the photocathode is sensitive.

8. The method of claim 4 wherein an X-ray image intensifier converts the X-ray image into the low-energy radiation image and comprises an entrance screen including a photocathode, and prior to the formation of the X-ray image the photocathode is irradiated with a radiation intensity distribution whereto the photocathode is sensitive.

9. An x-ray examination apparatus comprising:
   an x-ray detector for deriving a low-energy radiation image from the x-ray image, and for deriving a primary image signal from the low-energy radiation image, and
   a correction system for deriving a corrected image signal from a calibration signal and the primary image signal, wherein the correction system is arranged to generate a calibration low-energy radiation distribution and to derive a calibration signal from the calibration low-energy radiation distribution.

10. The apparatus of claim 9 wherein the x-ray detector comprises an X-ray image intensifier comprising an entrance screen including a phothocathode, wherein the X-ray image intensifier is equipped with a radiation source for irradiating the photocathode, and wherein the correction system generates the calibration low-energy radiation distribution by briefly activating the radiation source.

11. An X-ray image intensifier as claimed in claim 10, wherein the radiation source comprises a light-emitting diode (LED) for emitting radiation whereto the photocathode is substantially sensitive.

12. The X-ray image intensifier of claim 10, wherein the radiation source comprises a light-emitting source for emitting flashes of radiation whereto the photocathode is substantially sensitive.

* * * * *